United States Patent
Salkintzis et al.

(10) Patent No.: US 8,897,753 B2
(45) Date of Patent: Nov. 25, 2014

(54) METHOD FOR RETRIEVING CONTENT BY A WIRELESS COMMUNICATION DEVICE HAVING FIRST AND SECOND RADIO ACCESS INTERFACES, WIRELESS COMMUNICATION DEVICE AND COMMUNICATION SYSTEM

(75) Inventors: Apostolis K. Salkintzis, Athens (GR); Pelopidas Lappas, Marousi (GR)

(73) Assignee: Motorola Mobility LLC, Libertyville, IL (US)

( * ) Notice: Subject to any disclaimer, the term of this patent is extended or adjusted under 35 U.S.C. 154(b) by 427 days.

(21) Appl. No.: 13/271,414

(22) Filed: Oct. 12, 2011

(65) Prior Publication Data

US 2013/0095806 A1    Apr. 18, 2013

(51) Int. Cl.
*H04L 12/58* (2006.01)
*H04W 72/12* (2009.01)
*H04W 88/06* (2009.01)
*H04W 72/08* (2009.01)

(52) U.S. Cl.
CPC .......... *H04W 72/1215* (2013.01); *H04W 88/06* (2013.01); *H04W 72/087* (2013.01)
USPC ........................ 455/412.1; 455/413; 370/328

(58) Field of Classification Search
CPC .................................................... H04W 28/00
USPC ................................ 455/413, 412.1; 370/328
See application file for complete search history.

(56) References Cited

U.S. PATENT DOCUMENTS 6,460,087 B1  10/2002  Saito et al.
6,810,412 B1  10/2004  Chang
7,539,175 B2   5/2009  White et al.
7,616,559 B2  11/2009  Thompson et al.

(Continued)

FOREIGN PATENT DOCUMENTS

EP       1626528 A1   2/2006
WO    2007025161 A2   3/2007

(Continued)

OTHER PUBLICATIONS

Kuschnig R et al.: "Improving Internet Video Streaming Performance by parallel TCP-Based Request-Response Streams", Consumer Communications and Networking Conference (CCNC), 2010 7th IEEE, IEEE, Piscataway, NJ, USA Jan. 9, 2010, all pages.

(Continued)

*Primary Examiner* — Amancio Gonzalez
(74) *Attorney, Agent, or Firm* — Lerner, David, Littenberg, Krumholz & Mentlik, LLP

(57) ABSTRACT

In a wireless communication device having a first and a second radio access interface for respectively communicating with a first and a second access network, a method for retrieving content comprises receiving a request for retrieval of content from a remote server and retrieving a first part of the requested content over a first radio access technology connection. When the retrieval of the first part is determined not to meet a required QoS threshold, the second radio access interface is activated. A next part of the requested content to be retrieved is divided into a first portion for retrieval over the first radio access technology connection and a second portion for retrieval over a second radio access technology connection such that retrieval of the first and second portions are estimated to meet the required QoS threshold, and are retrieved over the first and second radio access technology connections, respectively.

23 Claims, 7 Drawing Sheets

(56) References Cited

U.S. PATENT DOCUMENTS

| | | |
|---|---|---|
| 2005/0243849 A1 | 11/2005 | Wentink |
| 2005/0262257 A1 | 11/2005 | Major et al. |
| 2007/0117072 A1* | 5/2007 | Adjali et al. ............ 434/236 |
| 2008/0133771 A1 | 6/2008 | Vardi et al. |
| 2010/0011117 A1 | 1/2010 | Hristodorescu et al. |
| 2010/0329248 A1 | 12/2010 | Eggert et al. |
| 2011/0075605 A1* | 3/2011 | De Pasquale et al. ........ 370/328 |
| 2011/0080868 A1 | 4/2011 | Krishnaswamy et al. |
| 2011/0235578 A1 | 9/2011 | Laganier et al. |
| 2011/0296006 A1 | 12/2011 | Krishnaswamy et al. |
| 2013/0227080 A1 | 8/2013 | Gao et al. |
| 2013/0311614 A1 | 11/2013 | Salkintzis |

FOREIGN PATENT DOCUMENTS

| | | |
|---|---|---|
| WO | 2008124796 A1 | 10/2008 |
| WO | 2010027858 A2 | 3/2010 |
| WO | 2010109054 A1 | 9/2010 |
| WO | 2010121205 A9 | 10/2010 |
| WO | 2011113031 A1 | 9/2011 |

OTHER PUBLICATIONS

Patent Cooperation Treaty, International Search Report and Written Opinion of the International Searching Authority for International Application No. PCT/US2012/059287, Mar. 6, 2013, 21 pages.

Ford, A. et al.: "Architectural Guidelines for Multipath TCP Development",Informational, Internet Engineering Task Force (IETF), (Request for Comments): RFC 6182, Mar. 2011, ISSN: 2070-1721, all pages.

Raiciu, C. et al.: "Coupled Congestion Control for Multipath Transport Protocols", Experimental, Internet Engineering Task Force (IETF), (Request for Comments): RFC 6356, University College London, Oct. 2011, ISSN: 2070-1721, all pages.

Stevens, W.: "TCP Slow Start, Congestion Avoidance, Fast Retransmit, and Fast Recovery Algorithms", Proposed Standard, Obsoleted by 2581, Network Working Group, (Request for Comments): RFC 2001, Jan. 1997, all pages.

Braden, B. et al.: "Recommendations on Queue Management and Congestion Avoidance in the Internet", Informational, Network Working Group, (Request for Comments): RFC 2309, Category: Informational, Apr. 1998, all pages.

Allman, M. et al.: "TCP Congestion Control", Draft Standard, Network Working Group, (Request for Comments): RFC 5681, Sep. 2009, all pages.

WiFi Alliance Technical Committee Hotspot 2.0 Task Group, Hotspot 2.0 Specification Phase 1, Version 0.39, Feb. 21, 2012, all pages.

Nguyen, Thinh et al.: "Multimedia Streaming Using Multiple TCP Connections", Performance, Computing, and Communications Conference, 2005, IPCCC 2005. 24th IEEE International, Apr. 7-9, 2005, pp. 215-223.

Kuschnig, Robert et al.: "Improving Internet Video Streaming Performance by Parallel TCP-based Request-Response Streams", In Proceedings of the 7th IEEE Consumer Communications and Networking conference (CCNC) , IEEE, Los Alamitos, CA USA, Jan. 2010, 5 pages.

Pralhad Deshpande et al.: "Hybrid Wireless Access for Vehicular Networking: Integrating 3G and Metro-Scale WiFi", Published—Graduate Research Conference, 2010, Stony Brook University, Mar. 19, 2010, all pages.

United States Patent and Trademark Office, "Non-Final Rejection" for U.S. Appl. No. 13/476,551 dated Jan. 9, 2014, 21 pages.

\* cited by examiner

METHOD FOR RETRIEVING CONTENT BY A WIRELESS COMMUNICATION DEVICE HAVING FIRST AND SECOND RADIO ACCESS INTERFACES, WIRELESS COMMUNICATION DEVICE AND COMMUNICATION SYSTEM

FIELD OF THE DISCLOSURE

This disclosure relates to a method for retrieving content by a wireless communication device having first and second radio access interfaces, such that multiple radio access technologies can be used at the same time to support high-quality content retrieval. A wireless communication device and a communication system are also disclosed and claimed.

BACKGROUND OF THE DISCLOSURE

Media content streaming is becoming more popular over the Internet and recent research shows that streaming traffic constitutes the biggest percentage of the overall Internet traffic today and it is expected that this percentage will grow in the future as mobile devices (typically, smart phones) are used increasingly for mobile streaming services. With an increasing number of mobile phone users experiencing mobile streaming, there is a need for streaming optimizations so that streaming experience on mobile devices is improved.

There are currently several streaming technologies designed to operate efficiently over time-varying mobile communications channels, for example, HTTP Live Streaming (HLS) and 3GPP Dynamic Adaptive Streaming over HTTP (DASH). An article entitled 'Apple proposes HTTP streaming feature as IETF standard' (retrievable via http://arstechnica.com/web/news/2009/07/apple-proposes-http-streaming-feature-as-a-protocol-standard.ars) gives a brief overview of HLS and DASH is described in 3GPP Technical Specification TS 26.247 (v10.0.0), entitled 'Transparent end-to-end Packet-switched Streaming Service (PSS); Progressive Download and Dynamic Adaptive Streaming over HTTP (3GP-DASH)'.

HLS and DASH support media streaming over a single communication path (or a single radio access technology connection) and adaptive streaming by switching the rate of the encoded media content to match the available transport capacity. With these technologies, the client retrieves the media content as a sequence of small "chunks" of constant duration (typically, near to 10 s). Each chunk can be selected from a plurality of chunks available for the same portion of the media content, e.g. a portion of media content may be represented by a high quality chunk, medium quality chunk, etc. The high quality chunk will have more information and so will be greater in size than the medium quality chunk. Every time the client retrieves a chunk, it measures the retrieval duration. When the duration exceeds a certain threshold (or when other implementation triggers apply), the client requests the next chunk with reduced quality and thus with reduced size that can be retrieved faster. This way, even when the capacity of the transport channel is reduced (e.g. due to channel variations and transmission effects), the streaming flow can be sustained, albeit with reduced quality.

An advantage of HLS/DASH mechanisms is that the streaming flow dynamically adapts to the available transport capacity and features considerable robustness and reliability in mobile communication systems. A disadvantage however is that the adaptation is performed at the expense of quality: when the transport channel deteriorates and cannot support high data rate, the streaming flow is sustained but with reduced quality. For example, when a mobile device uses HLS or DASH to stream a video content over WiFi, the stream content will switch to low quality when the WiFi network gets congested (e.g., when it cannot support TCP throughput of more than 100-200 Kbps) and cannot support the high quality stream. This has a negative effect on the user experience.

Thus, HLS and 3GPP DASH provide efficient and adaptive technologies for mobile media streaming, but they cannot maintain high quality streaming experience when the transport channel deteriorates significantly.

In an effort to improve the video streaming performance, several publications propose the use of multiple simultaneous IP interfaces to retrieve video chunks in parallel. For example, in an article entitled 'Improving Internet Video Streaming Performance by Parallel TCP-based Request-Response Streams' by Robert Kuschnig, Ingo Kofler and Hermann Hellwagner (retrievable via http://alvand.basu.ac.ir/~nassiri/courses/AdvNetworks/papers/paper25.pdf), the authors propose a request-response-based client-driven streaming system, much similar to HLS/DASH, which however uses multiple interfaces to simultaneously retrieve multiple chunks. The reported performance results indicate that multipath chunk retrieval can provide an overall TCP throughput that is relatively stable over a vast range of round trip time (RTT) values and much higher compared to single path chunk retrieval. In this publication, however, the mobile device keeps multiple interfaces continuously active. As a result, such multipath streaming mechanisms can have a considerable negative impact on battery consumption.

Another known technology that can be used for enhanced streaming experience is Multipath TCP (MPTCP) (see, for example, the Multipath TCP Internet drafts which are retrievable via http://tools.ietf.org/wg/mptcp/).

With MPTCP, the client and the server establish multiple, parallel TCP connections (typically over different communication technologies) which are simultaneously used to retrieve the media content. The advantage is that MPTCP can provide increased overall throughput by exploiting the available capacity over multiple communication paths. So, when a HTTP streaming session is conducted on top of MPTCP, the overall transport capacity can be increased and thus improved streaming experience is expected since low-quality media chunks will rarely be required. A disadvantage however is that both the client and the server must be upgraded to support MPTCP which in most cases can be impractical. To alleviate this issue an MPTCP proxy can be used between the client and the server as proposed in a presentation entitled 'mptcp proxies' by Mark Handley (retrievable via www.ietf.org/proceedings/80/slides/mptcp-4.ppt). In this case, only the client and the proxy need to support MPTCP and not the streaming/media servers. Yet, there is still a requirement to upgrade the network infrastructure. Also, the use of proxies (or other middle boxes) breaks the end-to-end transparency and can create several issues, e.g., with applications that carry transport information in the payload (FTP, SIP, RTSP, etc). In addition, with MPTCP it is the server that performs the transmission scheduling (i.e., the allocation of media data to the available communication paths or TCP sub-flows) and therefore, the client cannot decide which path or radio access technology to use. This is an additional disadvantage because the server may choose to send data over the most expensive communication path and the client has no power to avoid or otherwise control this behaviour.

BRIEF DESCRIPTION OF THE DRAWINGS

A method for retrieving content by a wireless communication device having first and second radio access interfaces, a wireless communication device and a communication system in accordance with different aspects of the disclosure will now be described, by way of example only, with reference to the accompanying drawings in which.

DETAILED DESCRIPTION OF THE INVENTION

The present disclosure will be described with reference to a wireless communication device capable of operating with a first access network and a second access network, with the first access network being a public WiFi network and the second access network being a 3G UMTS network. It will however be appreciated that the present disclosure may apply to other types of networks and wireless communication devices capable of operating with any combination of two or more different networks, which may be selected from, for example: GSM; Enhanced Data rates for GSM Evolution (EDGE); General Packet Radio System (GPRS); CDMA, such as IS-95; CDMA2000; WCDMA or Universal Mobile Telecommunications System (UMTS); Fourth Generation Long Term Evolution (LTE); other wide area network communication systems; Private Mobile Radio (PMR); Worldwide Interoperability for Microwave Access (WIMAX); WLAN; other 3G or 4G networks; or the like. By describing the disclosure with respect to 3G UMTS and WiFi networks, it is not intended to limit the disclosure in any way.

The wireless communication device in accordance with the disclosure may be a portable or mobile telephone, a Personal Digital Assistant (PDA), a wireless video or multimedia device, a portable computer, a netbook, a tablet device, an embedded communication processor or similar wireless communication device. In the following description, the communication device will be referred to generally as mobile device for illustrative purposes and it is not intended to limit the disclosure to any particular type of wireless communication device.

Figure 1:
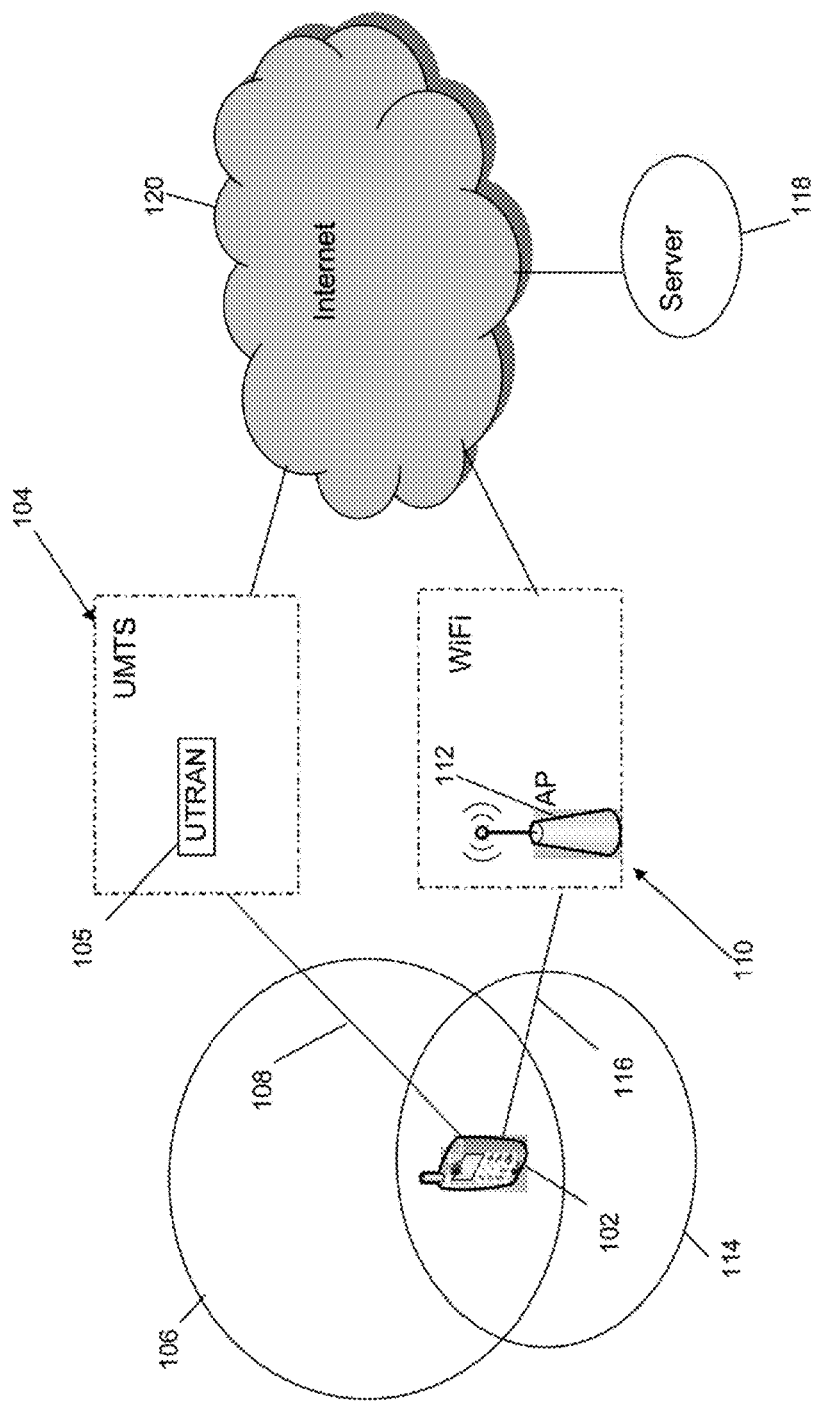
FIG. 1 is a block schematic diagram of a communication system in accordance with an example of an embodiment of the present disclosure.

Referring firstly to FIG. 1, a communication system 100 in accordance with an example of an embodiment of the disclosure comprises at least one mobile device 102 (but typically a plurality of mobile devices), capable of communicating with a first access network, such as WiFi network 110 and a second access network, such as UMTS network 104.

The UMTS network 104 provides a plurality of coverage areas or cells, such as coverage area or cell 106 of UTRAN (UMTS Terrestrial Radio Access Network) 105, as is well known in the art. The mobile device (also referred to as User Equipment (UE)) 102 can operate or communicate with the UMTS network 104 via radio communication link 108. The UMTS network 104 is communicatively coupled to a remote server 118 in, order to provide services to a user of the mobile device 102.

The WiFi network 110 provides a coverage area 114 served by at least one access point (AP) 112. The mobile device 102 can operate or communicate with the WiFi network 110 via radio communication link 116. The WiFi network 110 is also communicatively coupled to the remote server 118 in order to provide services to a user of the mobile device 102.

In FIG. 1, the UMTS network 104 and WiFi network 110 are communicably coupled to the remote server 118 via the Internet 120. The UMTS network 104 and WiFi network 110 may however be coupled to the remote server 118 by alternative communication means, such as a leased line, a virtual private network (VPN) or similar means.

The UMTS network 104 and the WiFi network 110 may also be coupled to one or more other networks (not shown), such as a packet data network, a CS network, an IP Multimedia Subsystem (IMS) network, in order to provide services to or from a mobile device.

It will be appreciated that although only coverage area 106 is shown in FIG. 1, the UMTS network 104 has a plurality of coverage areas and each coverage area is served by one or more base stations (not shown), known as NodeBs, which are part of the UTRAN 105. In addition, the WiFi network 110 may have a plurality of access points (APs) 112.

Figure 2:
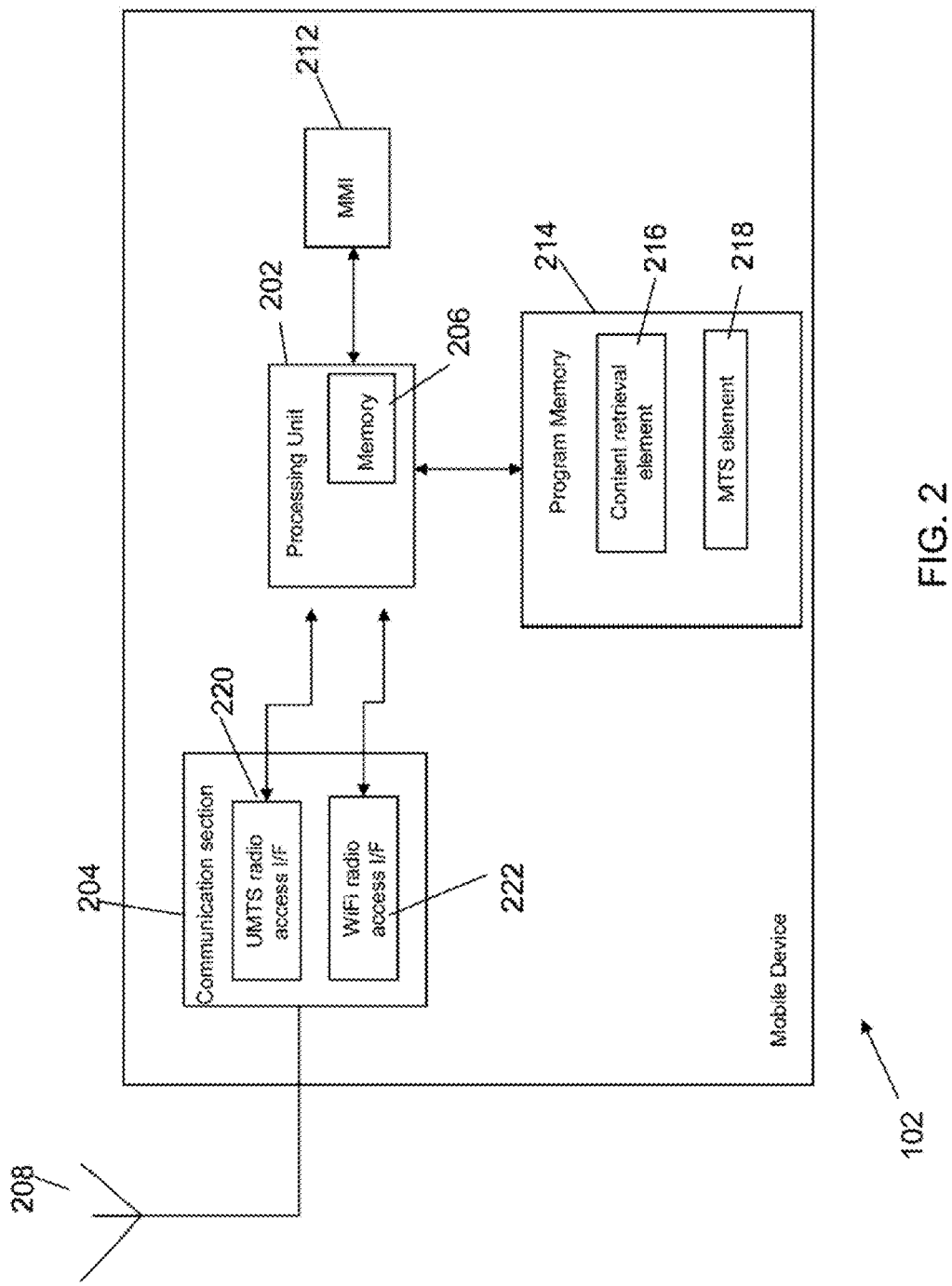
FIG. 2 is a block schematic diagram of a wireless communication device in accordance with an example of an embodiment of the present disclosure.

FIG. 2 is a block diagram of a wireless communication device, such as a mobile device 102 shown in FIG. 1, in accordance with an embodiment of the disclosure. As will be apparent to a skilled person, FIG. 2 shows only the main functional components of an exemplary mobile device 102 that are necessary for an understanding of the invention.

The mobile device 102 comprises a processing unit 202 for carrying out operational processing for the mobile device 102. The mobile device 102 also has a communication section 204 for providing wireless communication via a radio communication link with, for example, a NodeB (not shown) of the UTRAN 105 of the UMTS network 104 or the AP 112 of the WiFi network 110. The communication section 204 may comprise elements which are part of a UMTS radio access interface 220 of the mobile device 102 and elements which are part of a WiFi radio access interface 222 of the mobile device 102. For example, the communication section 204 typically includes elements such as at least one antenna 208, a receiver (not shown) and a transmitter (not shown), at least one modulation/demodulation section (not shown), and at least one coding/decoding section (not shown), for example, as will be known to a skilled person and thus will not be described further herein. The communication section 204 may include one set of elements for the UMTS radio access interface 220 and one set of elements for the WiFi radio access interface 222 or the interfaces 220, 222 may share elements. The communication section 204 is coupled to the processing unit 202. Thus, the mobile device 102 may communicate with the remote server 118 via the first radio access interface (e.g., WiFi radio access interface 222) and a first radio access technology connection (e.g., a TCP connection via the WiFi radio access interface 222) and via the second radio access interface (e.g., UMTS radio access interface 220) and a second radio access technology connection (e.g., a TCP connection via the UMTS radio access interface 220).

The mobile device 102 also has a Man Machine Interface (MMI) 212, including elements such as a key pad, microphone, speaker, display screen, for providing an interface between the mobile device and the user of the mobile device 102. The MMI 212 is also coupled to the processing unit 202.

The processing unit 202 may be a single processor or may comprise two or more processors carrying out all processing required for the operation of the mobile device 102. The number of processors and the allocation of processing functions to the processing unit is a matter of design choice for a skilled person. The mobile device 102 also has a program memory 214 in which are stored programs containing processor instructions for operation of the mobile device 102. The programs may contain a number of different program elements or sub-routines containing processor instructions for a variety of different tasks, for example, for: communicating with the user via the MMI 212; processing signalling messages (e.g., paging signals) received from the UTRAN 105 and WiFi network 110; and performing neighbouring coverage area measurements. Specific program elements stored in program memory 214 include a content retrieval application element 216 for requesting retrieval of content and a Multipath Transport Service (MTS) element 218 for enabling the content retrieval application element 216 to use multiple paths (or connections) to retrieve resources. The operation of the content retrieval application element 216 and the MTS element 218 will be described in more detail below.

The mobile device 102 may further include a memory 206 for storing information. The memory 206 is shown in FIG. 2 as part of the processing unit 202 but may instead be separate.

Figure 3:
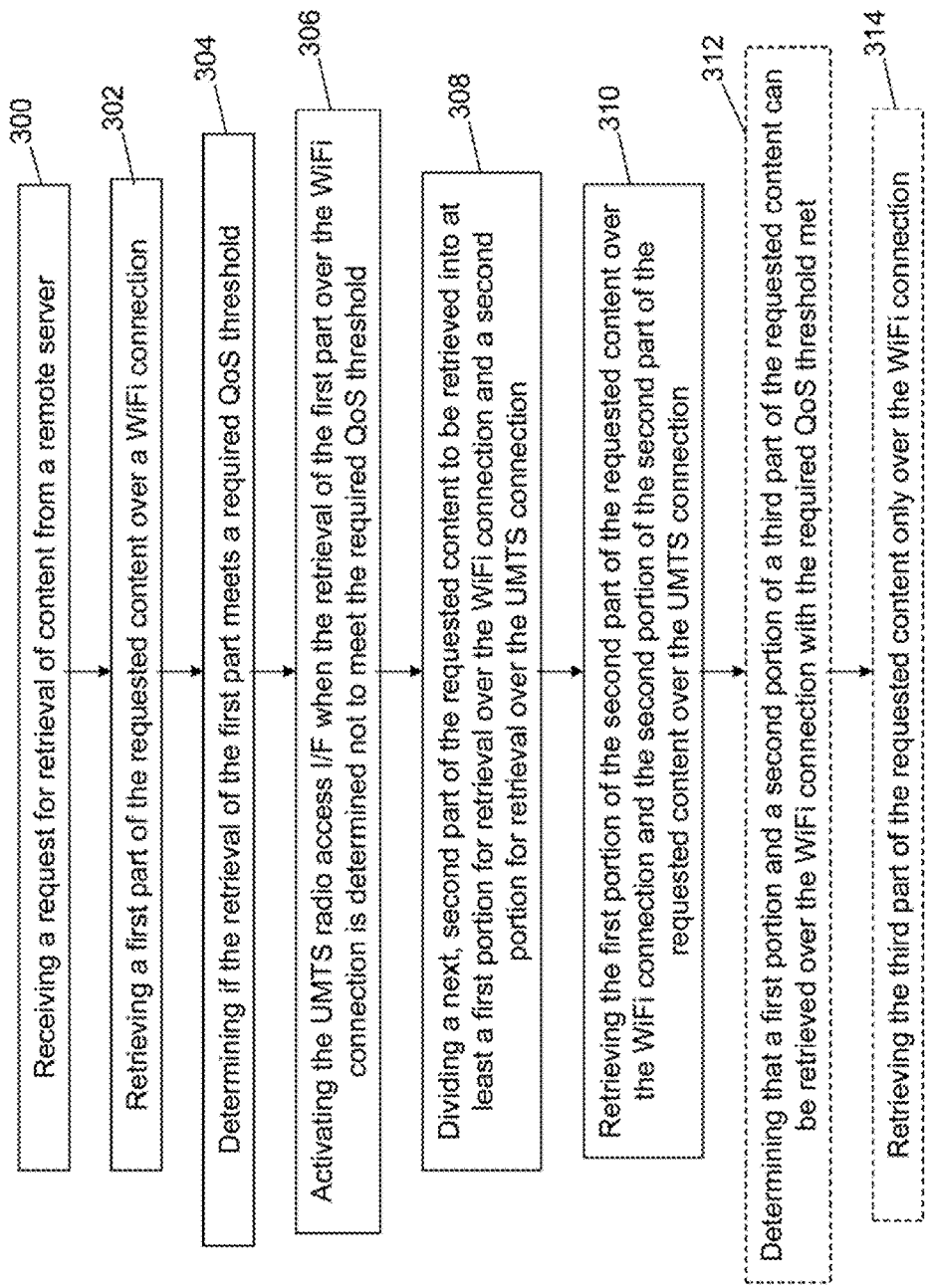
FIG. 3 is a flow diagram showing an example method for retrieving content by a wireless communication device in accordance with an embodiment of the disclosure.

Referring now to FIG. 3 which shows steps of a method for retrieving content by a wireless communication device having a first radio access interface for communication with a first access network, such as WiFi radio access interface 222 for communication with WiFi network 110, and a second radio access interface for communication with a second access network, such as UMTS radio access interface 220 for communication with UMTS network 104, in accordance with an example of an embodiment of the disclosure. The method shall be described with reference to the communication system 100 of FIG. 1 and the mobile device 102 of FIG. 2 by way of example. It is not intended to limit the invention to the particular types of networks shown and described with reference to FIG. 1.

In step 300, a request for retrieval of content from the remote server 118, communicably coupled to the UMTS network 104 and the WiFi network 110, is received at the mobile device 102. The request for retrieval of content may be received when only the first radio access interface 222 is active or when both the first 222 and second 220 radio access interfaces are active. For example, the mobile device 102 is in coverage area 114 and is communicating with WiFi network 110 via an active WiFi radio access interface 222. The request for retrieval may be received from a user of the mobile device 102. The content may be video, a web page, a file or other type of media content available from the remote server 118. For example, a user of the mobile device 102 is browsing a web site and identifies a video clip that the user wishes to retrieve.

The requested content may include different types of media content. In addition, the delivery or retrieval method used to deliver the requested content may be a streaming method, such as video streaming (live or not live) or may be a non-streaming method, such as downloading a file. Known streaming methods for mobile devices, such as HLS and DASH (discussed above), are based on HTTP streaming. In these streaming methods, the content is provided by a server (e.g., the remote server 118) in a series of chunks. This is also known as chunked transfer encoding. Typically, each of the chunks of a series are of constant duration.

In response to receiving a request for content, the mobile device 102 then retrieves a first part (e.g., a first chunk) of the requested content from the remote server 118 over a first radio access technology connection and via the first radio access interface, step 302. This may be controlled by the processing unit 202 under control of the content retrieval element 216. In the example arrangement when the first radio access interface is the WiFi radio access interface 222, the first part of the requested content is retrieved over a WiFi connection. The mobile device 102 then determines if the retrieval of the first part of the requested content over the first radio access technology connection meets a required Quality of Service (QoS) threshold for a part of the requested content, step 304.

In an example arrangement in which the requested content comprises a series of chunks, the first part of the requested content is a first chunk of the requested content and the retrieval of the first part of the requested content over the first radio access technology connection includes sending a request for the first chunk of the requested content over the first radio access technology connection to the remote server 118 and receiving the requested first chunk from the remote server 118 over the first radio access technology connection.

The required QoS threshold may be a required delay and/or required bandwidth for retrieval of content or throughput rate. In the case of media content encoded in a series of chunks, the required QoS threshold is the maximum time required to retrieve a chunk of the requested content. The required QoS threshold is provided to the mobile device 102. For example, the required QoS may be preconfigured in the mobile device 102, the mobile device 102 may determine the required QoS from receiving content or the mobile device 102 may receive data associated with the requested content from the remote server 118 providing the requested content, the data including the required QoS threshold. In an example arrangement, the remote server 118 sends data (e.g., meta data) associated with the requested content, the data including information describing the requested content (e.g., QoS threshold), to the mobile device 102 in response to receiving a retrieval request from the mobile device for data associated with the requested content. The data associated with the requested content may also be referred to as a 'playlist' or 'index' and may indicate, for example, the number of chunks of which the requested media content is composed, the duration of each chunk, etc.

The required QoS threshold is determined such that the playback rate of the requested content at the mobile device 102 matches the rate at which the content is received at the mobile device 102.

In an arrangement where the required QoS threshold is a required bandwidth, the mobile device 102 determines whether the retrieval meets the required QoS threshold by comparing the bandwidth available for the first radio access technology connection with the required QoS bandwidth. If the available bandwidth is less than the required QoS bandwidth, then the mobile device 102 determines that the first radio access technology connection does not meet the required QoS threshold. If the available bandwidth is equal to or greater than the required QoS bandwidth, then the mobile device 102 determines that the first radio access technology connection does meet the required QoS threshold.

In an arrangement where the content includes a series of chunks and the required QoS threshold is a maximum time required to retrieve a chunk, the mobile device 102 determines whether the chunk retrieval meets the required QoS threshold by comparing the time taken to receive the first part (i.e., chunk) at the mobile device 102 over the first radio access technology connection with the maximum time. If the time taken to receive the first chunk is greater than the maximum time, then the mobile device 102 determines that the first radio access technology connection does not meet the required QoS threshold. If the time taken to receive the first chunk is equal to or less than the maximum time, then the mobile device 102 determines that the first radio access technology connection does meet the required QoS threshold.

Thus, the mobile device 102 is arranged to compare a measured QoS parameter for the retrieval of part of the requested content (e.g., the mobile device determines the available bandwidth, time taken to receive first chunk) with the required QoS threshold of the QoS parameter to determine whether the first radio access technology connection meets the QoS requirements.

The mobile device 102 (under the control of the processing unit 202) activates the second radio access interface, for example the UMTS radio access interface 220, when the retrieval of the first part of the requested content over the first radio access technology connection is determined not to meet the required QoS threshold, step 306: for example, when a first chunk is retrieved with a delay larger than the maximum time. The mobile device 102 activates the second radio access interface under the control of the MTS element 218. In an example arrangement, the mobile device 102 activates the second radio access interface when the retrieval of the first part of the requested content over the first radio access technology connection is determined not to meet the required QoS threshold and when configuration information stored in the mobile device 102, for example, in memory 206, permits the requested content to be retrieved over multiple radio access interfaces. The configuration information may be user defined and/or provided by an operator. The configuration information may indicate simply whether multiple radio access interfaces may be used or not and/or may be more specific and specify that multiple radio access interfaces may be allowed for certain types of content and/or delivery/retrieval methods and not allowed for other types of content or delivery/retrieval methods. For example, the configuration information may indicate that multiple radio access interfaces may be allowed for content to be retrieved by File Transfer Protocol (FTP) and HTTP but not permitted for other protocols. In the following description with reference to FIGS. 4 and 5, the configuration information is discussed in more detail and is referred to as a Multipath Policy.

The mobile device 102 (under control of the processing unit 202) divides a next, second part of the requested content to be retrieved into at least a first portion for retrieval over the first radio access technology connection and a second portion for retrieval over a second radio access technology connection and via the activated second radio access interface 220, step 308. The first and second portions are selected such that retrieval of the first and second portions are estimated or expected to meet the required QoS threshold. The mobile device 102 sends a request to the remote server 118 for the first portion over the first radio access technology connection and sends a request to the remote server 118 for the second portion over the second radio access technology connection. Thus, the mobile device 102 requests and retrieves the second part of the requested content over the first and second radio access technology connections. This enables the second part of the requested content to be retrieved simultaneously over the first and second radio access technology connections in order to achieve faster retrieval.

The requested content is retrieved simultaneously in the sense that a portion of the requested content is received via the first radio access interface at the same time or substantially at the same time as a portion of the requested content is received via the second radio access interface (that is, not sequentially).

In an example arrangement in which the requested content comprises a series of chunks, the second part of the requested content is a next, second chunk of the requested content and the mobile device 102 divides the next chunk of the requested content to be retrieved into at least a first portion of a first length for retrieval over the first radio access technology connection and a second portion of a second length for retrieval over the second radio access technology connection. The first length of the first portion is selected such that retrieval of the first portion of the next chunk over the first radio access technology connection is estimated to meet the required QoS threshold and the second length of the second portion of the next chunk is then dependent on a remaining portion of the next chunk remaining after selecting the first portion. In other words, as much as possible of the next chunk is sent over the first radio access technology connection whilst still meeting the required QoS threshold and the remainder of the next chunk is requested over the second radio access technology connection. Thus, when the mobile device 102 retrieves a chunk or a portion of a chunk over the first radio access technology connection, it measures the achievable throughput of the first radio access technology connection (e.g., by dividing the length of the first portion to the time required to retrieve the first portion) and uses this measured throughput to estimate how long it will take to retrieve a first portion of the next chunk over the first radio access technology connection. In this way, the mobile device 102 can select the length of the first portion of the next chunk so that retrieval of this first portion over the first radio access technology connection is expected to meet the required QoS threshold. In an example illustration, a first portion of the next chunk is sent over WiFi and is 100 Kbytes (kilobytes) and is received in 4 seconds (sec). A second portion of the next is sent over 3G and is 50 Kbytes. The throughput over WiFi is then 100 Kbytes/4sec=25 Kbytes/sec. If both portions are transferred over WiFi, it would take 6 seconds (150 Kbytes/(25 Kbytes/sec)). If the calculated 6 seconds over WiFi is smaller than the required QoS threshold (typically, 10 sec), then the next chunk is retrieved over WiFi only and 3G is not used. If the calculated 6 seconds is larger than the required QoS threshold, then the next chunk is retrieved in portions over both radio accesses again.

The mobile device 102 (under control of the processing unit 202) then retrieves the first portion of the second part of the requested content over the first radio access technology connection and the second portion of the second part of the requested content over the second radio access technology connection, step 310. In the example arrangement when the first radio access interface is the WiFi radio access interface 222 and the second radio access interface is the UMTS radio access interface 220, the mobile device 102 sends a request for the first portion of the next part of the requested content and the first portion of the next part of the requested content is retrieved over a WiFi connection and the mobile device 102 sends a request for the second portion of the next part of the requested content and the second portion of the next part of the requested content is retrieved over a UMTS connection.

In an example arrangement, if the mobile device 102 determines that the first and second portions of a subsequent, third part can be retrieved over the first radio access technology with the required QoS threshold met, step 312, then the mobile device 102 deactivates the second radio access interface 220 and retrieves next parts, such as the third part, of the requested content over only the first radio access technology connection, step 314, until the requested content has been retrieved or when the retrieval of a next part of the requested content over the first radio access technology connection is determined not to meet the required QoS threshold. For example, the mobile device 102 measures the throughput of the first radio access technology connection (by dividing the length of the first portion to the time required to retrieve the first portion) and determines if the first radio access technology connection could support the retrieval of the entire next part, or chunk, (i.e., of a first portion and of a second portion combined) within the required QoS threshold. If the first radio access technology connection can support the retrieval of the entire next, e.g., third, chunk, the second radio access interface 220 is deactivated. In this way, the second radio access interface 220 is only used when the first radio access interface 222 alone cannot meet the required QoS threshold, thus minimizing the battery consumption and assuring that chunks of the requested content are retrieved with the required QoS threshold.

The mobile device 102 performs the reassembly/sequencing of the retrieved chunks for delivery to the application layer, thus resolving any delay differences between the WiFi 110 and UMTS 104 networks.

Figure 4:
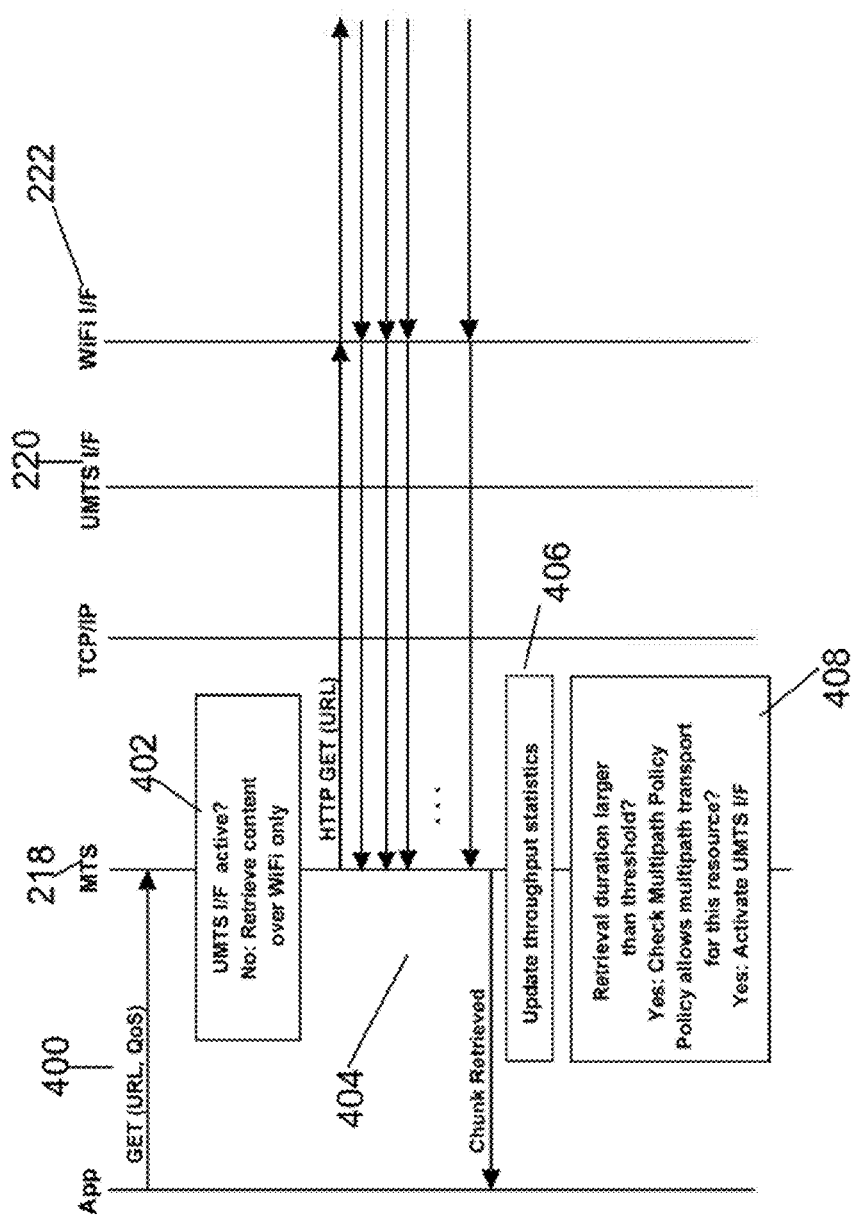
FIG. 4 is a diagram showing an example message flow for retrieving content by a wireless communication device over a first radio access interface in accordance with an embodiment of the disclosure.
Figure 5:
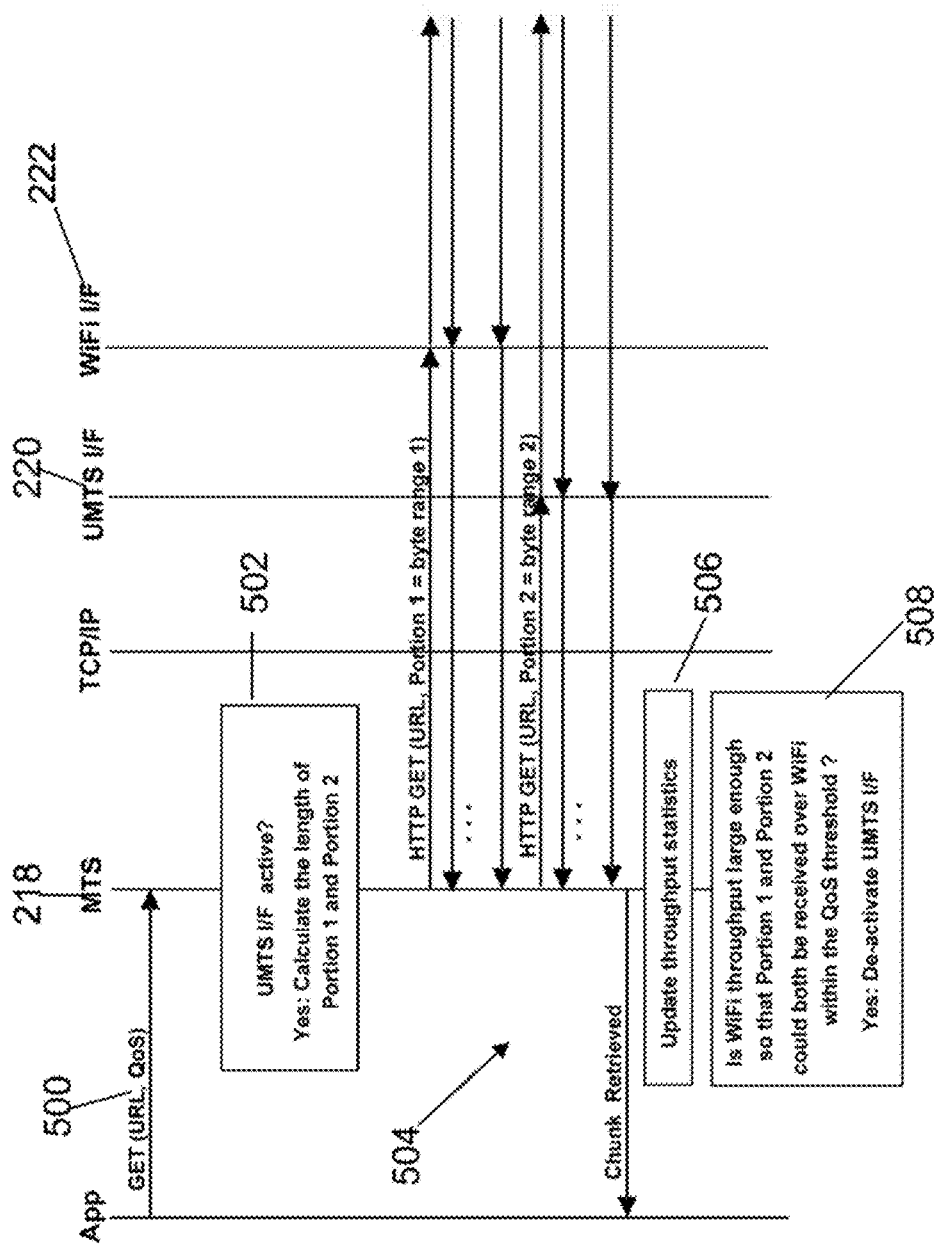
FIG. 5 is a diagram showing an example message flow for retrieving content by a wireless communication device over first and second radio access interfaces in accordance with an embodiment of the disclosure.

In order to get a better understanding of the operation of the MTS element 218, the operation of the MTS element 218 will now be described with reference to FIGS. 4 and 5 which show signal flows for retrieving content by a mobile device 102: FIG. 4 is a signal flow when only one radio access interface is used (in this case the WiFi interface 222) and FIG. 5 is a signal flow when two one radio access interfaces are used (in this case the WiFi interface 222 and the UMTS interface 220). FIGS. 4 and 5 will be described with reference to streaming content including a series of chunks. This is for illustrative purposes and it is not intended to limit the disclosure to retrieving content by streaming chunks of content.

The MTS element 218 is assumed to receive a series of GET requests from an application (App), such as the content retrieval element 216, and each GET request is for a single chunk of content. The GET request includes an identifier of the requested chunk of content (e.g., a URL (Uniform Resource Locator)) and the required QoS threshold (e.g., 10 sec).

The MTS element 218 receives a GET request for a first chunk of a requested content, step 400. Initially, the mobile device 102 uses the WiFi radio access interface 222 for chunk retrieval and measures the time it takes to retrieve each chunk over WiFi. Provided that this time is equal to or less than the required QoS threshold (e.g., 10 sec), then the UMTS radio access interface 220 is not used and subsequent chunks are retrieved over WiFi only, step 402. The steps (shown in FIG. 4 together as steps 404) taken to retrieve the first chunk are not described in detail and would be readily apparent to a person skilled in the art. These steps include the typical HTTP signalling for requesting and receiving the content of a chunk, which is delivered as a series of HTTP packets. After the content of a chunk is received, it is delivered to the application (App) and then the MTS element 218 updates the measured throughput over WiFi, step 406. This measured throughput is required when a chunk retrieval over WiFi does not meet the required QoS threshold and the MTS element 218 needs to calculate how much of the next chunk will be requested over WiFi.

When the time it takes to retrieve a chunk over WiFi exceeds a required QoS threshold (e.g., when more than 10 sec are required to retrieve a high-quality chunk), then the mobile device 102 checks the Multipath Policy and provided that the Policy allows multipath transport for the requested content, the UMTS radio access interface 220 is also activated, step 408. The next chunk is retrieved as two portions: first portion over WiFi and second portion over UMTS (as shown on FIG. 5). The length of the first portion is calculated based on the measured WiFi throughput. The Multipath Policy is configuration information in the mobile device 102 (typically, operator rules or user preferences) which indicate if the mobile device 102 can use multiple radio access technology connections for content retrieval. For example, a user may restrict the mobile device 102 from using multiple radio access technology connections simultaneously in order to minimize battery consumption or communications cost. Additionally or alternatively, an operator may provide Multipath Policy configuration information to the mobile device 102 to indicate whether multipath resource retrieval is allowed or not.

To retrieve the next chunk, the MTS element 218 receives a GET request for the next chunk, step 500. The MTS element 218 checks that the UMTS radio access interface 220 is active (because the previous chunk was not received within the required QoS threshold), and then the MTS element 218 calculates the length of the first and second portions of the next chunk, step 502. The length of the first portion is calculated so that retrieval of the first portion over WiFi will not take longer than the required QoS threshold (e.g., 10 sec). This calculation is based on the last measured throughput of the WiFi connection. The length of the second portion is simply the rest of the chunk. By calculating the length of the first and second portions this way, the mobile device 102 can ensure that WiFi is used as much as possible and UMTS is used only to supplement the throughput of WiFi, when necessary.

The next chunk is then retrieved over WiFi and UMTS. The steps (shown in FIG. 5 together as steps 504) taken to retrieve the next chunk are not described in detail and would be readily apparent to a person skilled in the art. These steps include the typical HTTP signalling for requesting and receiving the content of a portion of a chunk, which is delivered as a series of HTTP packets. Each portion corresponds to a byte range, for example, the first portion could correspond to bytes 0-99999 and the second portion could correspond to bytes 100000-end. Note that any HTTP 1.1 compliant server supports byte ranges and can deliver to the mobile device only the requested range of bytes from a chunk. After the first portion over WiFi and the second portion over UMTS are received, the MTS element 218 combines them into a chunk and delivers the combined chunk to the application (App). Subsequently, the MTS element 218 updates again the measured throughput over WiFi, step 506.

If the MTS element 218 determines (e.g., based on the measured WiFi throughput) that both the first and second portions of a received chunk could have been received over WiFi only (i.e., if the entire chunk could have been received over WiFi only with the required QoS threshold met), this means that the WiFi throughput has increased compared to previously measured throughput and the entire next chunk can be received over WiFi only. Then the MTS element 218 deactivates the UMTS radio access interface 220, step 508. The next chunk is then retrieved over WiFi as before for step 400.

The requests sent to the remote server 118 by the mobile device 102 may take the following form:

GET http://example.com/folder/chunk1.avi
GET http://example.com/folder/chunk2.avi
Etc. ...

So, each request contains only the requested chunk.

Figure 6:
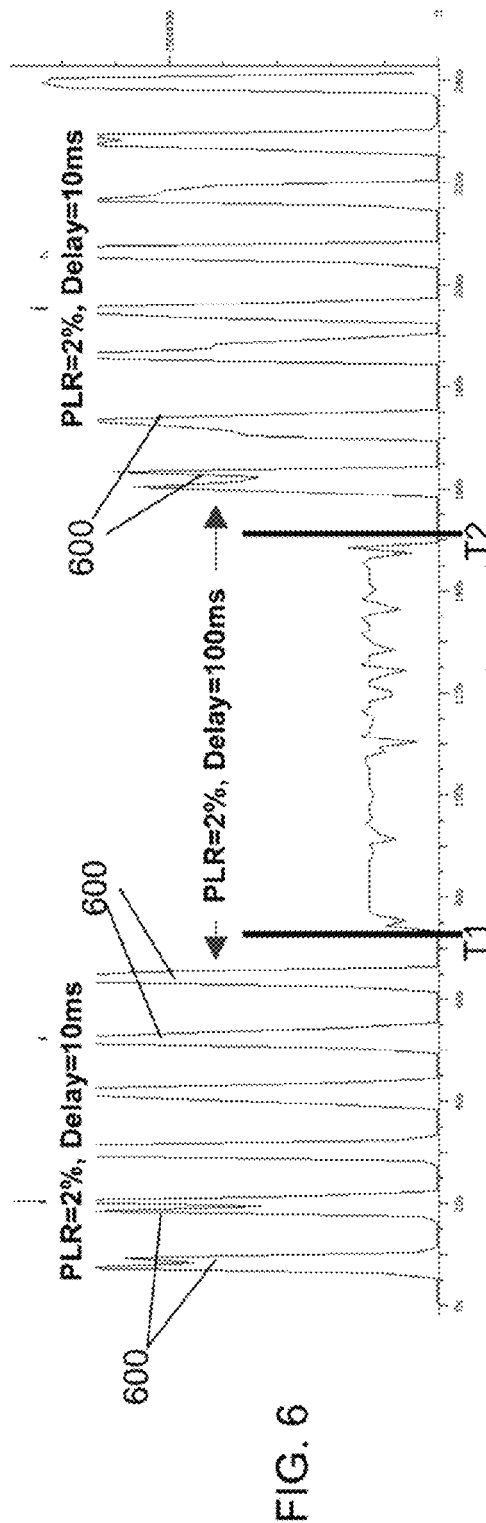
FIG. 6 is a graph showing a variation over time in the content received at a prior art wireless communication device due to different channel conditions.
Figure 7:
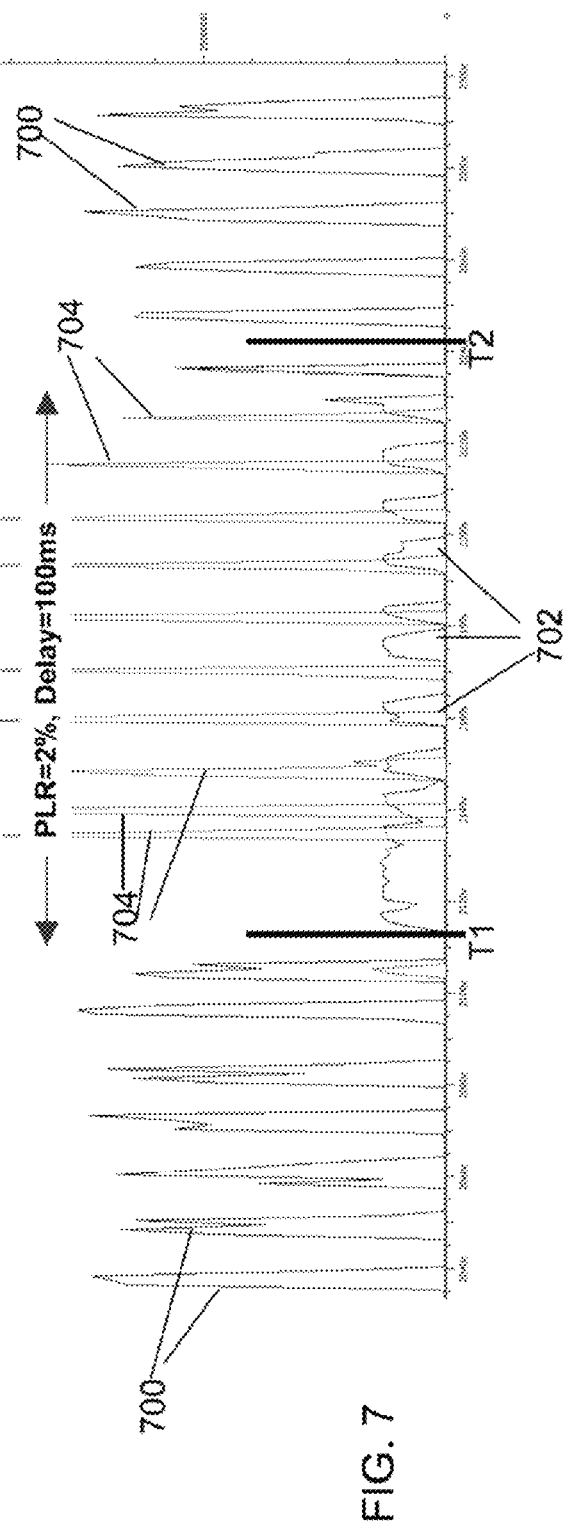
FIG. 7 is a graph showing a variation over time in the content received at the wireless communication device in accordance with an example of an embodiment of the present disclosure due to different channel conditions.

FIGS. 6 and 7 are graphs showing experimental results for a mobile device having a WiFi radio access interface and a UMTS radio access interface for different channel conditions on WiFi. The graphs show a series of chunks 600 of requested content received over time: each peak on the graph corresponds to a chunk. The Y axis represents the traffic rate in bits per second and the X axis represents time. The different channel conditions on the WiFi radio access interface are shown as different 'Packet Delay' and different 'Packet Loss Rate' (PLR). FIG. 6 shows chunks 600 received over a single connection (WiFi only) and FIG. 7 shows chunks received over multiple connections in accordance with the disclosure.

As can be seen in FIG. 6, initially chunks 600 received over WiFi meet the requirements of the required QoS threshold (they are received much faster than 10 sec). After time T1, the delay of the WiFi connection is increased from 10 ms (milliseconds) to 100 ms, causing chunk retrieval over WiFi to take much long than 10 seconds. As a consequence, chunks cannot be received by the mobile device within the required QoS threshold and streaming is stopped until after time T2 when again the delay returns to 10 ms and streaming starts again. Thus, in the case shown in FIG. 6, either the streaming of the content to the mobile device is stopped altogether or low-quality chunks (e.g., if HLS or DASH is used) would be received between T1 and T2.

As can be seen in FIG. 7, initially chunks 700 received over WiFi meet the requirements of the required QoS threshold (they are received much faster than 10 sec). After time T1, the delay of the WiFi connection is again increased from 10 ms to 100 ms, causing chunk retrieval over WiFi to take much long than 10 seconds. This condition results in activation of the UMTS radio access interface and the next chunks are received over WiFi and UMTS. A first portion 702 of a next chunk is received over WiFi and a second portion 704 of a next chunk is received over UMTS. Most of the traffic is scheduled on WiFi. Portions of chunks are received over WiFi and UMTS until the mobile device determines at T2 that the WiFi throughput has increased again (due to decreasing the WiFi connection delay to 10 ms again) and that both portions of the next chunk could be received over WiFi within the required QoS threshold of 10 seconds. The mobile device then deactivates the UMTS radio access interface and chunks 700 are received again over WiFi only. The peaks of the first 702 and second 704 portions vary between time T1 and T2 due to varying WiFi conditions. The traffic on UMTS (i.e., the length of the second portion) varies depending on traffic on WiFi (i.e., the length of the first portion). The greater the delay on WiFi, the more traffic on UMTS. Thus, high quality streaming is maintained even when WiFi conditions deteriorate below acceptable QoS limits.

This disclosure describes a novel method to improve the content retrieval experience (e.g., support high-quality streaming or other throughput-intensive services) by exploiting the multi-RAT (radio access technology) capabilities of modern mobile devices. In contrast to other technologies (for example as described in the introduction) which lower the stream data rate in order to combat throughput degradations, the method in this disclosure combats the throughput degradations by activating an additional radio access interface and using two (or multiple) radio interfaces to retrieve different parts of the media content simultaneously. As a consequence, the streaming session can be continued with high quality and the aggregate throughput can remain at relatively high levels even when one available radio access technology is congested. This is specifically true when the different paths or connections over the different radio access interfaces feature low cross-correlation properties and, thus, the occurrences of congestion or low throughput on the different radio access interfaces are independent across the time domain.

The mobile device in accordance with the disclosure can select how the available radio access technology connections are used. For example, in the case of the mobile device supporting WiFi and UMTS, the mobile device may prefer WiFi access to be used as much as possible and to utilize some UMTS capacity only when the WiFi capacity is not sufficient to maintain high quality streaming. Thus, if the second radio access interface is more costly, such as UMTS, the mobile device can arrange such that the second radio access interface is only utilized when the first radio access (less costly, such as WiFi) is not sufficient to maintain high-quality streaming. For example, when the streaming session takes place over WiFi, the mobile device will continue to use only WiFi as long as the WiFi connection has enough capacity for the high quality stream to be received. When the WiFi gets congested and cannot support more than 800-1000 Kbps (kilobytes per second) (which is typically required for high-quality mobile streaming), only then is the UMTS interface activated and used to supplement the throughput that is provided over the WiFi interface. This way, the battery consumption is not significantly impacted and the wide-area mobile network is offloaded from streaming traffic as much as possible.

Thus, by dynamically activating (and de-activating) radio interfaces based on the measured transport conditions, the solution in accordance with the disclosure can reduce battery consumption compared to the known arrangements described in the introduction which improve the video streaming performance by requiring the mobile device to keep multiple interfaces continuously active.

In contrast to HLS/DASH, the solution in accordance with the disclosure does not switch to a lower quality stream when the available capacity is reduced but, instead, a second TCP/HTTP connection is activated (over a second radio access) to amend the capacity of the first TCP/HTTP connection (or first radio access). Thus, high quality streaming can be sustained which improves user experience compared to the HLS/DASH methods.

In the case of retrieval of content via a non-streaming method, such as downloading a file, if the available bandwidth is not large, then it will take longer to retrieve the file. In this case, the mobile device in accordance with the disclosure could detect that the QoS threshold is not being met (e.g., the QoS threshold is a required bandwidth) and then use two radio access technology connections to retrieve the file more quickly.

In another embodiment in accordance with the disclosure, a mobile device 102, which includes a first radio access interface (e.g., WiFi radio access interface 222) for communication with a first access network (e.g. WiFi network 110) and a second radio access interface (e.g., UMTS radio access interface 220) for communication with a second access network (e.g., UMTS network 104), uses configuration information stored in the mobile device 102 (e.g., in memory 218) to determine whether multiple radio access interfaces can be used to retrieve the requested content or only one radio access interface is used to retrieve the requested content. In this embodiment, QoS for the retrieval of content is not considered by the mobile device when deciding whether to use one radio access interface or multiple radio access interfaces. In response to receiving a request for retrieval of content from a remote server (118), the mobile device 102 (e.g., under the control of the processing unit 202) determines, according to configuration information (e.g., Multipath Policy) stored in the mobile device 102, whether the mobile device 102 is permitted to retrieve the requested content over multiple radio access interfaces. When the configuration information indicates that the requested content can be retrieved over multiple radio access interfaces, the mobile device (e.g., under the control of the processing unit 202 and the content retrieval element 216) is configured to retrieve the requested content simultaneously over the first radio access interface 222 and over the second radio access interface 220. When the configuration information indicates that the requested content cannot be retrieved over multiple radio access interfaces, the mobile device 102 is configured to retrieve the requested content over the first radio access interface 222 only. It will be readily apparent to a person skilled in the art that details described above for the embodiments described with reference to FIGS. 1-7 also apply to this another embodiment.

The requested content is retrieved simultaneously in the sense that a portion of the requested content is received via the first radio access interface at the same time or at substantially the same time as a portion of the requested content is received via the second radio access interface (that is, not sequentially).

The configuration information may be user defined and/or provided by an operator. The configuration information may indicate simply whether multiple radio access interfaces may be used or not and/or may be more specific and specify that multiple radio access interfaces may be allowed for certain types of content and/or delivery/retrieval methods and not allowed for other types of content or delivery/retrieval methods. For example, the configuration information may indicate that multiple radio access interfaces may be allowed for content to be retrieved by File Transfer Protocol (FTP) and HTTP but not permitted for other protocols. The configuration information may be referred to as Multipath Policy.

In the event that multiple radio access interfaces are permitted and requested content is retrieved simultaneously over the first and second radio access interfaces, the mobile device is configured to divide the requested content for retrieval with a first portion of a first part of the requested content being received over a first radio access technology connection and via the first radio access interface and a second portion of a first part of the requested content being received simultaneously over a second radio access technology connection and via the second radio access interface.

For example, when the requested content is a file comprising 100000 bytes, a first part of the requested content may include bytes 1-2000, a next part bytes 2001-4000, a next part bytes 4001-6000, etc. until the end of the file. The mobile device 102 may then retrieve bytes 1-1000 as a first portion of the first part of the requested content via the first radio access interface and simultaneously retrieve bytes 1001-2000 as a second portion of the first part of the requested content via the second radio access interface. The mobile device 102 may then retrieve bytes 2001-3000 as a first portion of the next part of the requested content via the first radio access interface and simultaneously retrieve bytes 3001-4000 as a second portion of the next part of the requested content via the second radio access interface. In another example where the requested content comprises a series of chunks, the mobile device 102 may be arranged to divide the requested content so that even numbered chunks are retrieved via the first radio access portion and odd numbered chunks are retrieved via the second radio access portion. It is believed that other ways of dividing the requested content would be readily apparent to a person skilled in the art. An advantage of this embodiment is that the requested content may be downloaded quicker when retrieval via multiple radio access interfaces is permitted and multiple radio access interfaces are used to retrieve requested content. For example, a requested file can be downloaded quicker over two radio access interfaces downloading portions of the requested content simultaneously compared to using a single radio access interface.

Since the embodiments in accordance with the disclosure are implemented on the mobile device 102, the solution does not require any upgrade on the network side. Thus, the media/HTTP servers do not need to be upgraded and there is no need for a proxy function (as with MPTCP). Furthermore, the embodiments in accordance with the disclosure do not require any low-level upgrades on the mobile device (client side). To support MPTCP in the mobile device, the mobile device's kernel (i.e. transport layer) is typically upgraded in order to enhance the networking layer.

Figure 8:
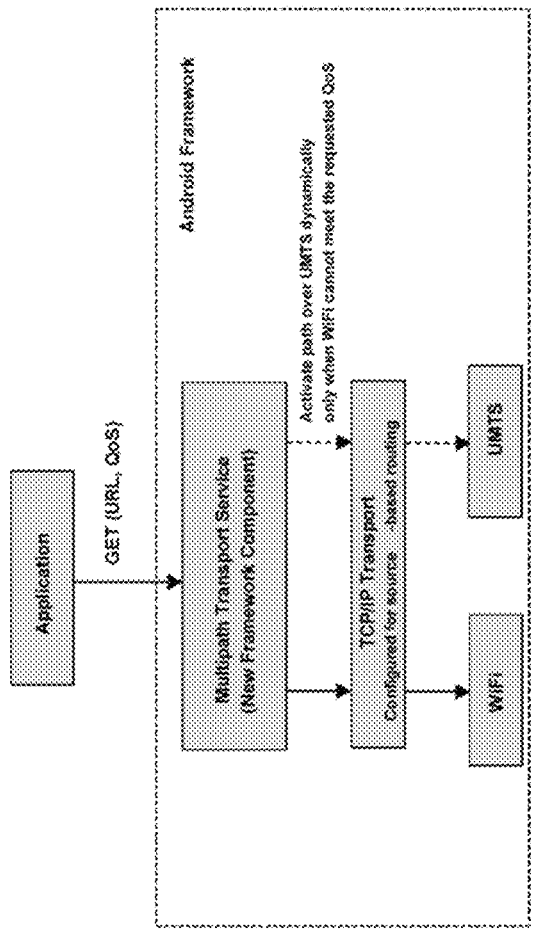
FIG. 8 is a block schematic diagram of part of a wireless communication device representing the implementation of the method for retrieving content in accordance with an example of an embodiment of the present disclosure on an Android platform.

This requires the device's operating system to be changed and so can be a costly process. In the solution described in this disclosure, only a new service component is required in the application layer which makes implementation considerably easier. In FIG. 2, this component is referred to as the MTS element 218 and the MTS component in an Android platform is shown in FIG. 8. The MTS component provides a suitable API (Application Programming Interface) that enables Android applications to enjoy multipath resource retrieval.

The disclosure has been described with respect to a mobile device capable of communicating with two access networks. It will be appreciated that the disclosure may also be implemented in a mobile device capable of communicating with two or more access networks, so that the requested content may be received over two or more connections with two or more access networks in order to meet the required QoS threshold.

In the foregoing specification, the invention has been described with reference to specific examples of embodiments of the invention. It will, however, be evident that various modifications and changes may be made therein without departing from the broader scope of the invention as set forth in the appended claims.

Some of the above embodiments, as applicable, may be implemented using a variety of different processing systems. For example, the Figures and the discussion thereof describe an exemplary architecture which is presented merely to provide a useful reference in discussing various aspects of the disclosure. Of course, the description of the architecture has been simplified for purposes of discussion, and it is just one of many different types of appropriate architectures that may be used in accordance with the disclosure. Those skilled in the art will recognize that the boundaries between program and system/device elements are merely illustrative and that alternative embodiments may merge elements or impose an alternate decomposition of functionality upon various elements.

The invention claimed is:

1. A method for retrieving content by a wireless communication device having a first radio access interface for communication with a first access network and a second radio access interface for communication with a second access network, the method in the wireless communication device comprising:
receiving a request for retrieval of content from a remote server;
retrieving a first part of the requested content over a first radio access technology connection and via the first radio access interface and determining if the retrieval of the first part over the first radio access technology connection meets a required Quality of Service (QoS) threshold for the requested content;

activating the second radio access interface when the retrieval of the first part of the requested content over the first radio access technology connection is determined not to meet the required QoS threshold;

dividing, by the wireless communication device, a next part of the requested content to be retrieved into at least a first portion for retrieval over the first radio access technology connection and a second portion for retrieval over a second radio access technology connection and via the second radio access interface, wherein the first and second portions are selected such that retrieval of the first and second portions are estimated to meet the required QoS threshold; and retrieving simultaneously the first portion of the next part of the requested content over the first radio access technology connection and the second portion of the next part of the requested content over the second radio access technology connection.

2. The method of claim 1, further including:
deactivating the second radio access interface in response to determining that the first and second portions of a next part can be retrieved over the first radio access technology connection with the required QoS threshold met and retrieving next parts of the requested content over only the first radio access technology connection until the requested content has been retrieved or when the retrieval of a next part of the requested content over the first radio access technology connection is determined not to meet the required QoS threshold.

3. The method of claim 1, further including:
sending a retrieval request for data associated with the requested content to the remote server; and
receiving data associated with the requested content from the remote server, the data including the required QoS threshold for the requested content.

4. The method of claim 1, wherein the requested content comprises a series of chunks.

5. The method of claim 1, wherein the requested content comprises a series of chunks and wherein the required QoS threshold includes a maximum time required to retrieve a chunk of the requested content.

6. The method of claim 1, wherein the requested content comprises a series of chunks, wherein a first part of the requested content is a first chunk of the requested content and wherein retrieving a first part of the requested content over the first radio access technology connection includes:
sending a request for the first chunk of the requested content over the first radio access technology connection to the remote server providing the requested content; and
receiving the requested first chunk from the remote server over the first radio access technology connection.

7. The method of claim 6, wherein a next part of the requested content is a next chunk of the requested content and dividing includes dividing a next chunk of the requested content to be retrieved into at least a first portion of a first length for retrieval over the first radio access technology connection and a second portion of a second length for retrieval over the second radio access technology connection, wherein the first length of the first portion is selected such that retrieval of the first portion meets the required QoS threshold and the second length of the second portion is dependent on a remaining portion of the next chunk remaining after selecting the first portion.

8. The method of claim 1, wherein activating the second radio access interface comprises activating the second radio access interface when the retrieval of the first part of the requested content over the first radio access technology connection is determined not to meet the required QoS threshold and when configuration information stored in the wireless communication device permits the requested content to be retrieved over multiple radio access interfaces.

9. A wireless communication device including:
a first radio access interface for communication with a first access network;
a second radio access interface for communication with a second access network; and
a processing unit configured to:
in response to receiving a request for retrieval of content from a remote server, retrieve a first part of requested content over a first radio access technology connection and via the first radio access interface and determine if the retrieval of the first part over the first radio access technology connection meets a required Quality of Service, QoS, threshold for the requested content;
activate the second radio access interface when the retrieval of the first part of the requested content over the first radio access technology connection is determined not to meet the required QoS threshold;
divide a next part of the requested content to be retrieved into at least a first portion for retrieval over the first radio access technology connection and a second portion for retrieval over a second radio access technology connection and via the second radio access interface, wherein the first and second portions are selected such that retrieval of the first and second portions are estimated to meet the required QoS threshold; and
retrieve simultaneously the first portion of the next part of the requested content over the first radio access technology connection and the second portion of the next part of the requested content over the second radio access technology connection.

10. The wireless communication device of claim 9, wherein the processing unit is further configured to:
deactivate the second radio access interface in response to determining that the first and second portions of a next part can be retrieved over the first radio access technology connection with the required QoS threshold met and retrieve next parts of the requested content over only the first radio access technology connection until the requested content has been retrieved or when the retrieval of a next part of the requested content over the first radio access technology connection is determined not to meet the required QoS threshold.

11. The wireless communication device of claim 9, wherein the processing unit is further configured to control the wireless communication device to send a retrieval request for data associated with the requested content to the remote server and to receive data associated with the requested content from the remote server, the data including the required QoS threshold for the requested content.

12. The wireless communication device of claim 9, wherein the requested content comprises a series of chunks and wherein the required QoS threshold includes a maximum time required to retrieve a chunk of the requested content.

13. The wireless communication device of claim 9, wherein the requested content comprises a series of chunks, wherein a first part of the requested content is a first chunk of the requested content and wherein the processing unit is configured to retrieve a first part of the requested content over the first radio access technology connection by controlling the wireless communication device to send a request for the first chunk of the requested content over the first radio access technology connection to the remote server providing the requested content and to receive the requested first chunk from the remote server over the first radio access technology connection.

14. The wireless communication device of claim 13, wherein a next part of the requested content is a next chunk of the requested content and the processor is configured to divide a next chunk of the requested content to be retrieved into at least a first portion of a first length for retrieval over the first radio access technology connection and a second portion of a second length for retrieval over the second radio access technology connection, wherein the first length of the first portion is selected such that retrieval of the first portion meets the required QoS threshold and the second length of the second portion is dependent on a remaining portion of the next chunk remaining after the first portion is selected.

15. The wireless communication device of claim 9, wherein the processing unit is configured to activate the second radio access interface when the retrieval of the first part of the requested content over the first radio access technology connection is determined not to meet the required QoS threshold and when configuration information stored in the wireless communication device permits the requested content to be retrieved over multiple radio access interfaces.

16. A communication system including:
a first radio access network;
a second radio access network;
a remote server for providing content, the remote server being communicably coupled to the first and second radio access networks; and
at least one wireless communication device, the at least one wireless communication device including:
a first radio access interface for communication with the first access network;
a second radio access interface for communication with the second access network; and
a processing unit configured to:
in response to receiving a request for retrieval of content from the remote server, retrieve a first part of requested content over a first radio access technology connection and via the first radio access interface and determine if the retrieval of the first part over the first radio access technology connection meets a required Quality of Service, QoS, threshold for the requested content;
activate the second radio access interface when the retrieval of the first part of the requested content over the first radio access technology connection is determined not to meet the required QoS threshold;
divide a next part of the requested content to be retrieved into at least a first portion for retrieval over the first radio access technology connection and a second portion for retrieval over a second radio access technology connection and via the second radio access interface, wherein the first and second portions are selected such that retrieval of the first and second portions are estimated to meet the required QoS threshold; and
retrieve simultaneously the first portion of the next part of the requested content over the first radio access technology connection and the second portion of the next part of the requested content over the second radio access technology connection.

17. The communication system of claim 16, wherein the processing unit is further configured to:

deactivate the second radio access interface in response to determining that the first and second portions of a next part can be retrieved over the first radio access technology connection with the required QoS threshold met and retrieve next parts of the requested content over only the first radio access technology connection until the requested content has been retrieved or when the retrieval of a next part of the requested content over the first radio access technology connection is determined not to meet the required QoS threshold.

18. The communication system of claim 16, wherein the processing unit is further configured to control the wireless communication device to send a retrieval request for data associated with the requested content to the remote server and to receive data associated with the requested content from the remote server, the data including the required QoS threshold for the requested content.

19. The communication system of claim 16, wherein the requested content comprises a series of chunks, wherein a first part of the requested content is a first chunk of the requested content and wherein the processing unit is configured to retrieve a first part of the requested content over the first radio access technology connection by controlling the wireless communication device to send a request for the first chunk of the requested content over the first radio access technology connection to the remote server providing the requested content and to receive the requested first chunk from the remote server over the first radio access technology connection.

20. The communication system of claim 19, wherein a next part of the requested content is a next chunk of the requested content and the processor is configured to divide a next chunk of the requested content to be retrieved into at least a first portion of a first length for retrieval over the first radio access technology connection and a second portion of a second length for retrieval over the second radio access technology connection, wherein the first length of the first portion is selected such that retrieval of the first portion meets the required QoS threshold and the second length of the second portion is dependent on a remaining portion of the next chunk remaining after the first portion is selected.

21. The communication system of claim 16, wherein the processing unit is configured to activate the second radio access interface when the retrieval of the first part of the requested content over the first radio access technology connection is determined not to meet the required QoS threshold and when configuration information stored in the wireless communication device permits the requested content to be retrieved over multiple radio access interfaces.

22. A wireless communication device including a first radio access interface for communication with a first access network and a second radio access interface for communication with a second access network, and the wireless communication device comprising:
a processing unit configured to:
in response to receiving a request for retrieval of content from a remote server, determine, according to configuration information stored in the wireless communication device, whether the wireless communication device is permitted to retrieve the requested content over multiple radio access interfaces;
retrieve the requested content simultaneously over the first radio access interface and over the second radio access interface, when the configuration information indicates that requested content can be retrieved over multiple radio access interfaces; and retrieve the requested content over the first radio access interface only, when the configuration information indicates that the requested content cannot be retrieved over multiple radio access interfaces.

23. A method for retrieving content by a wireless communication device having a first radio access interface for communication with a first access network and a second radio access interface for communication with a second access network, the method in the wireless communication device comprising:

receiving a request for retrieval of content from a remote server;

determining, according to configuration information stored in the wireless communication device, whether the wireless communication device is permitted to retrieve the requested content over multiple radio access interfaces;

retrieving, by the wireless communication device, the requested content simultaneously over the first radio access interface and over the second radio access interface, when the configuration information indicates that requested content can be retrieved over multiple radio access interfaces; and retrieving the requested content over the first radio access interface only, when the configuration information indicates that the requested content cannot be retrieved over multiple radio access interfaces.

* * * * *